United States Patent
Park et al.

(10) Patent No.: US 7,769,293 B2
(45) Date of Patent: Aug. 3, 2010

(54) APPARATUS AND METHOD FOR LABEL TRANSMISSION IN OPTICAL PACKET DATA SWITCHING NETWORK

(75) Inventors: Keun-joo Park, Yongin-si (KR);
Hyun-chin Kim, Seoul (KR);
Young-kwang Seo, Seoul (KR);
Chun-ju Youn, Yongin-si (KR);
June-koo Rhee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1031 days.

(21) Appl. No.: 11/265,164

(22) Filed: Nov. 3, 2005

(65) Prior Publication Data

US 2006/0093355 A1    May 4, 2006

(30) Foreign Application Priority Data

Nov. 3, 2004    (KR) .................. 10-2004-0088650

(51) Int. Cl.
*H04J 14/00* (2006.01)
*H04B 10/20* (2006.01)

(52) U.S. Cl. .................. 398/51; 398/45; 398/48; 398/49; 398/50; 398/53; 398/54; 385/16; 385/17

(58) Field of Classification Search .............. 398/45, 398/48, 51, 49, 50, 53, 54; 385/16, 17
See application file for complete search history.

(56) References Cited

U.S. PATENT DOCUMENTS

| | | | |
|---|---|---|---|
| 5,680,490 A | | 10/1997 | Cohen et al. |
| 6,768,827 B2 * | | 7/2004 | Yoo .................. 385/14 |
| 6,876,817 B2 * | | 4/2005 | Wada et al. .................. 398/79 |
| 7,359,635 B2 * | | 4/2008 | Helbing et al. .................. 398/57 |

| | | | |
|---|---|---|---|
| 2006/0146855 A1 * | | 7/2006 | Kani et al. .................. 370/430 |

FOREIGN PATENT DOCUMENTS

| | | |
|---|---|---|
| JP | 9-105833 A | 4/1997 |
| JP | 2001-053722 A | 2/2001 |
| JP | 2001-111488 A | 4/2001 |
| JP | 2002-116341 A | 4/2002 |

(Continued)

OTHER PUBLICATIONS

JPO Machine Translation of JP 2001-53722A performed via http://www4.ipdl.inpit.go.jp/Tokujitu/tjsogodben.ipdl?N0000=115 on Mar. 2, 2009.*

(Continued)

*Primary Examiner*—Ken N Vanderpuye
*Assistant Examiner*—Daniel G Dobson
(74) *Attorney, Agent, or Firm*—Sughrue Mion, PLLC

(57) ABSTRACT

An apparatus and method for effectively transmitting a packet data and a control data of path information about the packet data in an optical packet data switching network. The method includes grouping a plurality of wavelengths into at least two wavelength bandwidths, each wavelength bandwidth being composed of neighboring wavelengths, and transmitting the optical packet data and the control data with wavelengths of different wavelength bandwidths respectively. Since the wavelength to transmit the optical packet data and the wavelength to transmit the control data has a difference from each other, a node receiving optical data easily divides the packet data and the control data.

7 Claims, 4 Drawing Sheets

FOREIGN PATENT DOCUMENTS

| | | | |
|---|---|---|---|
| JP | 2003249902 A | 9/2003 | |
| JP | 2004135352 A | 4/2004 | |
| JP | 2004140831 A | 5/2004 | |
| WO | 93/21706 A1 | 10/1993 | |

OTHER PUBLICATIONS

D.J. Blumenthal, et al., First Demonstration of Multihop All-Optical Packet Switching, Mar. 1994, IEEE Photonics Technology Letters, vol. 6, No. 3, pp. 457-460.*

Wada et al. "Cutting-Edge Technologies on Broadband and Scalable Photonic-Network-Packet switched networks based on all-optical label processing-" Optical Review, vol. 11, No. 2, Mar. 2004, pp. 106-112.

Hecht. "Packet switching takes steps toward optical" Laser Focus World, vol. 38, No. 6, Jun. 2002, pp. 131-139.

Kim et al. "Simple and robust all-optical label switching based on the 2nd harmonic subcarrier multiplexing technique" Optical Fiber Communication Conference 2004, vol. 2, Feb. 2004, pp. 226-228.

Search Report issued Apr. 1, 2010 by the European Patent Office.

* cited by examiner

APPARATUS AND METHOD FOR LABEL TRANSMISSION IN OPTICAL PACKET DATA SWITCHING NETWORK

CROSS REFERENCE TO RELATED APPLICATION

This application claims the benefit of Korean Patent Application No. 2004-88650, filed on Nov. 3, 2004, in the Korean Intellectual Property Office, the entire contents of which are incorporated herein by reference.

BACKGROUND OF THE INVENTION

1. Field of the Invention

The present invention relates to an optical packet data switching network. More particularly, the present invention relates to an apparatus and method for transmitting packet data and labels without error in an optical packet data switching network.

2. Description of the Related Art

A general optical packet data switching network is composed of a source node where a sender is located, a relay node where a sender and a receiver are located, and a destination node where a receiver is located. Optical signals generated at the source node are transmitted to the destination node through the relay node or directly transmitted to the destination node.

In the optical packet data switching network, a label, which indicates information about a packet data and a moving direction of the packet data, is transmitted. The label is generated at the source node and transmitted to the relay node, and the relay node updates the received label using a label swapping part. The relay node determines which node is the destination node of the received packet data based on the received label and transmits the K packet data to the determined destination node. A label swapping refers to a process that updates information of the received label about the moving direction of the packet data. The label swapping part updates the information about the moving direction by adding its own information to the received label.

The label is transmitted according to various schemes, for example, a time division multiplexing (TDM), a wavelength division multiplexing (WDM), an optical code division multiplexing (OCDM), a sub-carrier multiplexing (SCM), and an orthogonal optical label.

FIG. 1 is a view explaining the SCM. According to the SCM of FIG. 1, a packet data containing information exists in each wavelength $\lambda_n$ (n is a natural number), and carries a label with a sub-carrier at a position away from each wavelength $\lambda_n$ as much as $\pm f_c$ and is transmitted together with the label.

The WDM is a scheme that multiplexes plural optical channels having different wavelengths onto a single optical fiber and transmits the channels. According to the WDM, a packet data is transmitted with an odd-numbered wavelength $\lambda_{2m+1}$ (m is a positive integer) and a label is carried with an even-numbered wavelength $\lambda_{2m}$ (m is a positive integer). As described above, according to the WDM, the label is transmitted using an extra wavelength, and thus, an extra optical channel is required to transmit the label. Also, according to the WDM, since the wavelength to transmit the packet data and the wavelength to transmit the label are neighbors to each other, they are not easily divided from each other.

According to the TDM, a label is allocated between a first bit and an eighth bit of a packet data and transmitted. Unlike the WDM and SCM, the TDM requires a packet data processing to obtain label information, and thus, a label swapping process becomes complicated.

SUMMARY OF THE INVENTION

The present invention has been developed in order to address the above problems in the related art. Accordingly, an aspect of the present invention is to provide an apparatus and method for effectively transmitting packet data and labels about the packet data in an optical packet data switching network.

Another aspect of the present invention is to provide an apparatus and method capable of simply embodying a label swapping part for updating received labels.

The above aspects are achieved by providing a method for transmitting an optical packet data and a control data about the optical packet data. The method comprises grouping a plurality of wavelengths into at least two wavelength bandwidths, each wavelength bandwidth being composed of neighboring wavelengths, and transmitting the optical packet data and the control data with wavelengths of different wavelength bandwidths respectively.

The above aspects are also achieved by providing a node which transmits optical data including an optical packet data and control data about the optical packet data. The node comprises a packet generator for generating the optical packet data using wavelengths of a first wavelength bandwidth which is composed of neighboring wavelengths, a label generator for generating the control data using wavelengths of a second wavelength bandwidth which is composed of neighboring wavelengths except for the wavelengths of the first wavelength bandwidth, and a coarse wavelength division multiplexer for combining the packet data received from the packet data generator and the control data received from the label generator and outputting the combined data The above aspects are also achieved by providing a node which receives optical data including an optical packet data and control data about the optical packet data. The node comprises a first coarse wavelength division multiplexer for dividing wavelengths of a first wavelength bandwidth, which is composed of neighboring wavelengths, and wavelengths of a second wavelength bandwidth, a packet data receiver for receiving the optical packet data transmitted with the wavelengths of the first wavelength bandwidth, a label swapping part for receiving and updating the control data which is transmitted with wavelengths of the second wavelength bandwidth, and a second coarse wavelength division multiplexer for combining the packet data received from the packet data receiver and the control data received from the label swapping part into an optical data and the outputting the combined optical data.

BRIEF DESCRIPTION OF DRAWINGS

The above aspects and other advantages of the present invention become apparent by describing an embodiment of the present invention in greater detail with reference to the accompanying drawings, in which.

DETAILED DESCRIPTION OF AN EXEMPLARY EMBODIMENT

Hereinafter, an apparatus and method for effectively transmitting a packet data and a label in an optical packet switching network according to an embodiment of the present invention will now be described in detail.

Figure 1:
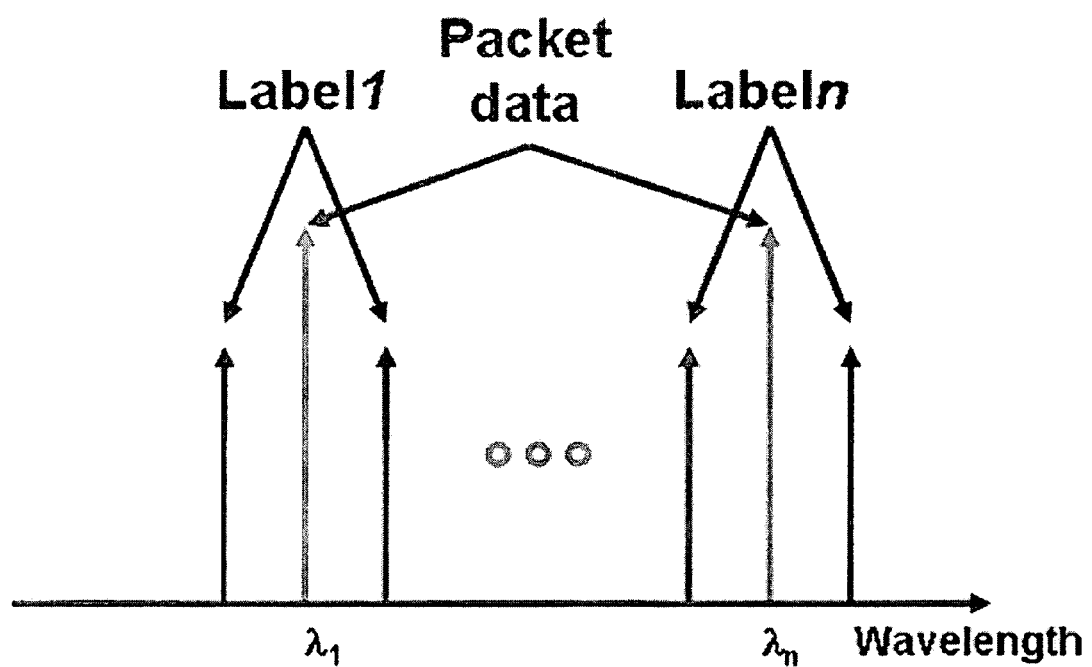
FIG. 1 is a view showing a label which is transmitted in an optical packet data switching network according to the sub-carrier multiplexing (SCM)
Figure 2:
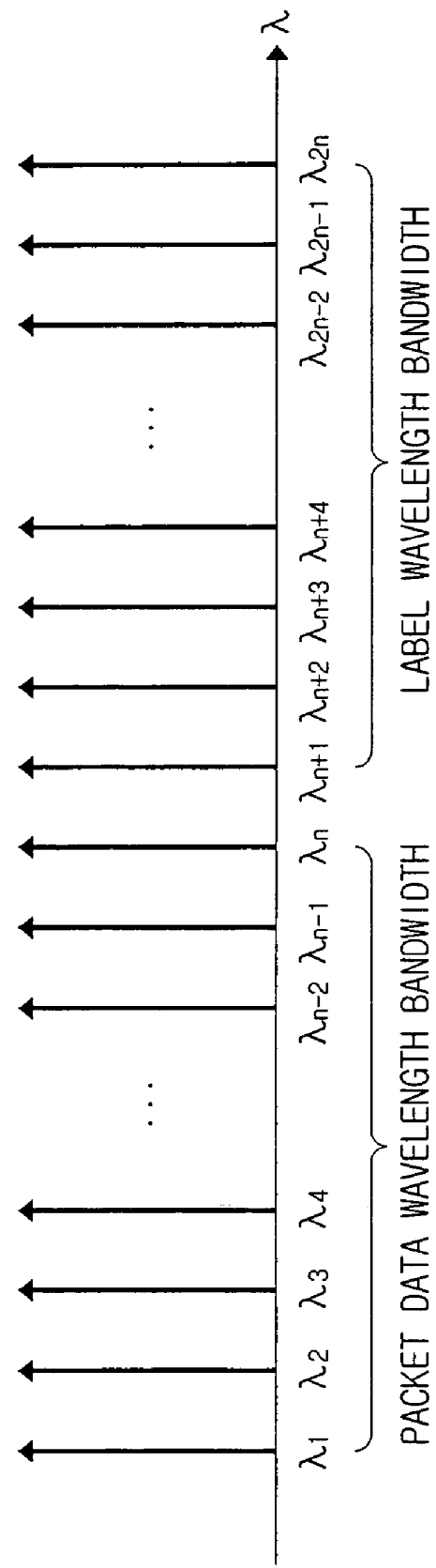
FIG. 2 is a view showing a packet data wavelength bandwidth to transmit a packet data and a label wavelength bandwidth to transmit a label according to an embodiment of the present invention.

FIG. 2 illustrates a wavelength bandwidth to transmit packet data and a wavelength bandwidth to transmit a label. The label is control data that encompasses path information about packet data. Referring to FIG. 2, the wavelength bandwidth to transmit the packet data is from $\lambda_1$ to $\lambda_n$, whereas the wavelength bandwidth to transmit the label is from $\lambda_{n+1}$ to $\lambda_{2n}$. The wavelength to transmit the packet data and the wavelength to transmit the label about the packet data has a constant wavelength difference $\lambda_n$ from each other. 'n' varies according to a user's setting. According to a conventional wavelength division multiplexing (WDM), a wavelength to transmit packet data and a wavelength to transmit a label about the packet data are neighbored to each other. If the wavelength to transmit the packet data is $\lambda_m$, then the wavelength to transmit the label about the packet data is $\lambda_{m+1}$. However, according to the present invention, if the wavelength to transmit the packet data is $\lambda_m$, the wavelength to transmit the label about the packet data is $\lambda_{n+m}$. Accordingly, the wavelength to transmit the packet data and the wavelength to transmit the label can be easily divided from each other. According to the embodiment explained in FIG. 2, since an optical signal transmitted from a node is the packet data and the label about the packet data, wavelengths are grouped into two wavelength bandwidths. However, if there are three types of optical signals transmitted from the node, wavelengths are grouped into three wavelength bandwidths to transmit the three types of optical signals.

Figure 3:
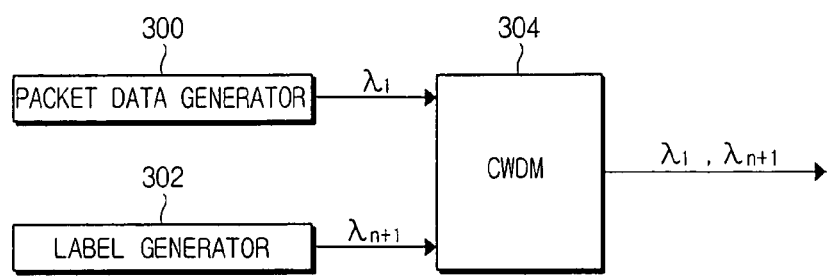
FIG. 3 is a view showing a source node in which a packet data and a label are generated according to an embodiment of the present invention.

FIG. 3 illustrates a source node in which packet data and a label about the packet data are generated according to an embodiment of the present invention. Referring to FIG. 3, the source node includes a packet data generator 300, a label generator 302 and a coarse wavelength division multiplexer (CWDM) 304. In addition to the above elements, other elements can be included in the source node. FIG. 3 illustrates only the necessary elements for the sake of brevity.

The data packet generator 300 generates packet data to be transmitted to a destination node. Since a process of generating the packet data has less relation to the present invention, its detailed description is omitted. The packet data generator 300 transmits the generated packet data with a wavelength of $\lambda_1$. Hereinafter, it is assumed that an optical channel for transmitting the packet data is identical to $\lambda_1$. The packet data generator 300 transmits the packet data to the CWDM 304 with $\lambda_1$.

The label generator 302 generates path information about the packet data generated by the packet generator 300. The path information includes an address of the source node, an address of the destination node and an address of a relay node which are to receive the packet data. The label generator 302 transmits the generated label with a wavelength of $\lambda_{n+1}$. Hereinafter, it is assumed that an optical channel for transmitting the label is identical to $\lambda_{n+1}$. The label generator 302 transmits the label to the CWDM 304 with $\lambda_{n+1}$.

The CWDM 304 combines the packet data received from the packet data generator 300 and the label received from the label generator 302 and outputs the resultant data. That is, the CWDM 304 combines the packet data of the wavelength of $\lambda_1$ and the label of the wavelength of $\lambda_{n+1}$ and outputs the resultant data through a single optical fiber. Of course, the source node transmits the label and then transmits the packet data. To this end, the relay node can previously set up an optical path based on the received label to transmit the packet data.

Figure 4:
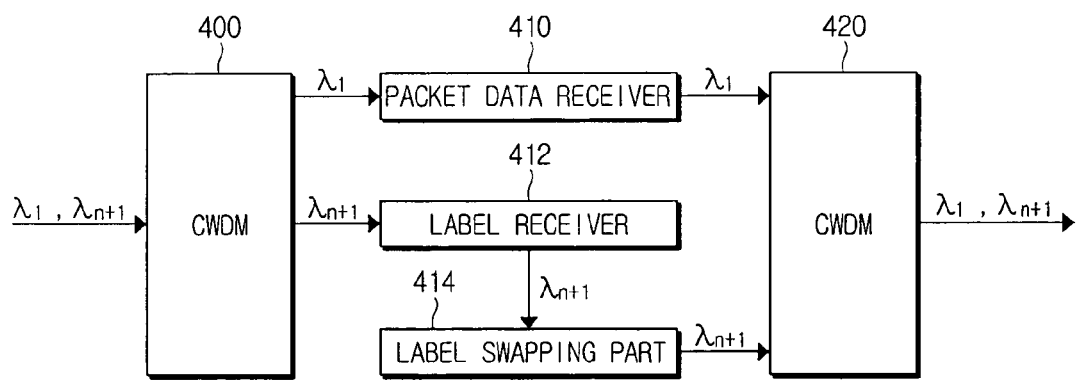
FIG. 4 is a view showing a relay node and a destination node in which a packet data and a label are processed according to an embodiment of the present invention.

FIG. 4 illustrates a relay node which receives packet data and a label according to an embodiment of the present invention. The relay node includes two CWDM 400 and 420, a packet data receiver 410, a label receiver 412, and a label swapping part 414. In addition to the above elements, other elements can be included in the relay node, but only the necessary elements are described here for the sake of brevity.

Although the source node and the relay node are different from each other in this description, they actually comprise the same elements. A node performs different operations according to whether the node serves as a source node or a relay node. That is, the source node as shown in FIG. 3 actually comprises a packet data receiver and a label receiver, but the packet data receiver and the label receiver are omitted from this description in order to highlight the function of transmitting the packet data and the label. Therefore, if the source node serves as a relay node, it performs corresponding operations through the packet data receiver and the label receiver.

The CWDM 400 receives the packet data and the label using an optical path from a neighboring source node or relay node. The packet data is received with $\lambda_1$, whereas the label is received with $\lambda_{n+1}$. The CWDM 400 divides the packet data and the label according to the wavelengths.

In general, a wavelength division multiplexer (WDM) includes a CWDM and a dense WDM (DWDM). The DWDM divides wavelengths (channels) such that divided wavelengths have a narrow gap thereamong. Channels divided by the DWDM have a channel gap of 1.6 nm (200 Ghz), 0.8 nm (100 Ghz) or 0.4 nm (50 Ghz). Compared to the DWDM, the CWDM divides wavelengths such that divided wavelengths have a broad gap thereamong. Generally, channels divided by the CWDM have a channel gap above 20 nm. Therefore, if the packet data and the label received through the optical path have a narrow wavelength gap, the DWDM easily divides the packet data and the label from each other, but the CWDM cannot do so.

However, according to the present invention, the packet data is transmitted with $\lambda_1$ and the label is transmitted with $\lambda_{n+1}$, and thus, the CWDM 400 easily divides the packet data and the label. The packet data divided by the CWDM 400 is transmitted to the packet data receiver 410, whereas the divided label is transmitted to the label receiver 412.

Because the packet data receiver 410 is not the destination node of the packet data, it forwards the packet data to the CWDM 420. If the packet data receiver 410 is the destination node of the packet data, the packet data receiver 410 forwards the packet data to an upper layer thereof. The packet data receiver 410 determines whether it is the destination node of the received packet data based on the received label.

The label receiver 412 receives the label from the CWDM 400 and analyzes information included in the label. The information includes a source node address and a destination node address of packet data which is to be received or has been already received. The label receiver 412 analyzes the information of the destination node address included in the label, and it determines whether it is a destination node of packet data subsequently received. Because the description of FIG. 4 is about the relay node, the relay node determines that it is not the destination node of the packet data. Accordingly, the label receiver 412 forwards the label to the label swapping part 414.

The label swapping part 414 updates the label received from the label receiver 412. That is, the label swapping part 414 adds its own information to the received label, thereby updating path information. FIG. 4 illustrates the label swapping part 414 and FIG. 3 illustrates the label generator 302. However, the label swapping part 414 and the label generator 302 may be integrated into a single structure. That is, the label swapping part 414 performs not only the label updating operation but also the label generation operation, or the label generator 302 performs not only the label generation operation but also the label updating operation.

The label swapping part 414 updates the label and then transmits the same to the CWDM 420. The CWDM 420 combines the packet data received from the packet data receiver 410 and the label received from the label swapping part 414 and outputs the resultant data. The operation performed by the CWDM 420 is identical to that of the CWDM 304 of FIG. 3.

Up to now, descriptions were made about a case in which a node serves as a source node and a relay node. If the node is a destination node, it is operated in the same manner as the relay node. However, the relay node forwards the packet data and label to a neighboring node, whereas the destination node forwards the packet data to an upper layer thereof.

Figure 5:
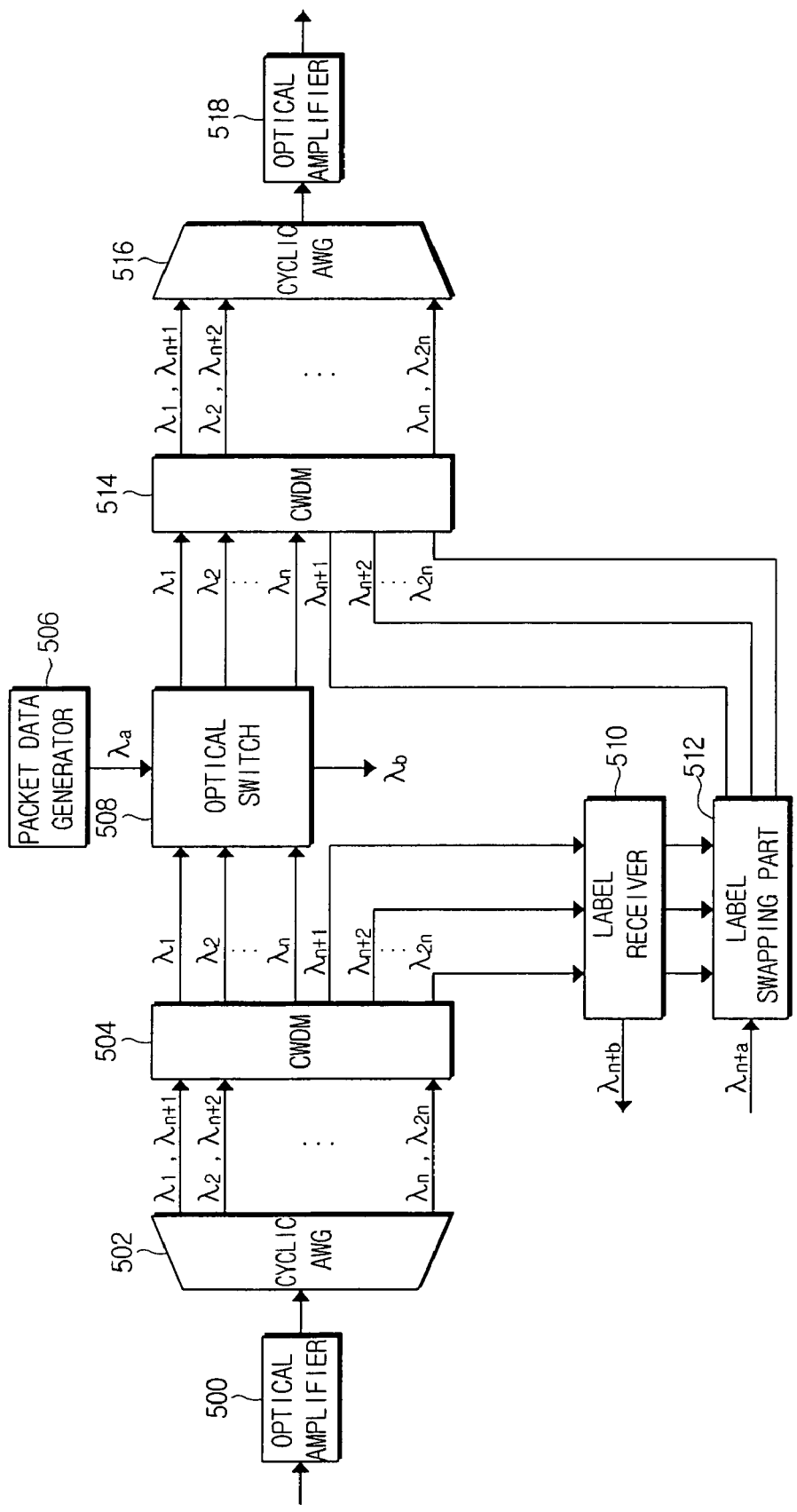
FIG. 5 is a view showing a node according to an embodiment of the present invention.

FIG. 5 illustrates a node according to an embodiment of the present invention. Hereinafter, a node according to an embodiment of the present invention will now be described in detail with reference to FIG. 5. The node comprises two cyclic array wavelength gratings (cyclic AWGs) 502 and 516, two CWDMs 504 and 514, a packet data generator 506, an optical switch 508, a label receiver 510, and a label swapping part 512. The node receives a packet data and a label which are amplified by an optical amplifier 500 and forwards the packet data and the label which are processed by the respective elements to another optical amplifier 518. In general, the optical amplifiers 500 and 518 are located in an optical path.

The optical amplifier 500 amplifies the packet data and the label and forwards the same to the cyclic AWG 502. The cyclic AWG 502 groups wavelengths of the received packet data and label and outputs the group of wavelengths. For example, if the number of wavelengths inputted into the cyclic AWG 502 is 2n, the cyclic AWG 502 groups the wavelengths into n number of groups, i.e., from a first group to an n-th group. The cyclic AWG 502 outputs each group of wavelengths through a single path. Hereinafter, the wavelengths are described in detail. The first group includes the wavelengths $\lambda_1, \lambda_{n+1}$ and the second group includes the wavelengths $\lambda_2, \lambda_{n+2}$. The n-th group includes the wavelengths $\lambda_n, \lambda_{2n}$. Each group consists of at least two wavelengths and is referred to as a wavelength group hereinafter. Each wavelength group is composed of a wavelength to transmit a packet data and a wavelength to transmit a label about the packet data.

The cyclic AWG 502 groups the wavelengths into the wavelength groups and forwards the groups of wavelengths to the CWDM 504. The CWDM 504 un-groups the groups of wavelengths into individual wavelengths. For example, if the CWDM 504 receives the first group of wavelengths, the first group is divided into the wavelengths $\lambda_1, \lambda_{n+1}$ respectively. If the CWDM 504 receives the n-th group of wavelengths, the n-th group is divided into the wavelength $\lambda_n, \lambda_{2n}$ respectively. The CWDM 504 forwards the wavelengths that belong to a packet data wavelength bandwidth to the optical switch 508, and forwards the wavelengths that belong to a label wavelength bandwidth to the label receiver 510. The packet data wavelength bandwidth and the label wavelength bandwidth were described in the above with reference to FIG. 2.

The packet data generator 506 generates a packet data and transmits the same to a destination node. The packet data generator 506 performs its function when the node serves as a source node. Referring to FIG. 5, the packet data generated by the packet data generator 506 is transmitted with $\lambda_a$. 'a' ranges from 1 to n. When the packet data generator 506 generates the packet data, a label about the packet data has to be generated, which was described in the above.

The optical switch 508 determines whether the node is the destination node of the packet data received from the CWDM 504 based on the received label. The optical switch 508 extracts the packet data the destination node of which is the node. As shown in FIG. 5, the optical switch 508 extracts the packet data having the wavelength of $\lambda_b$. 'b' ranges from 1 to n. Albeit not shown in FIG. 5, the optical switch 508 may include a packet data receiver or may perform a packet data receiving function.

The label receiver 510 detects whether there is a label among the received labels that indicates that the node is the destination node. If there is a label indicating that the node is the destination node, the label is extracted because the label does not need to be transmitted. Referring to FIG. 5, the label having the wavelength of $\lambda_{n+b}$ is extracted. The label receiver 510 transmits the received labels to the label swapping part 512.

The label swapping part 512 updates the labels received from the label receiver 510. The label swapping part 512 adds the information about the node to path information, thereby updating the label. The label swapping part 512 generates a label indicating the path information about the packet data if the node generates the packet data. For example, if the packet data generator 506 generates a packet data having a wavelength of $\lambda_a$, the label swapping part 512 generates a label of a wavelength of $\lambda_{n+a}$. The label swapping part 512 transmits the updated or generated labels to the CWDM 514.

The CWDM 514 groups the packet data received from the optical switch 508 and the labels received from the label swapping part 512 into groups, respectively, and outputs the groups of packet data and labels. The groups were described in the above. That is, the CWDM 514 performs a reverse operation to that performed by the CWDM 504. The cyclic AWG 516 also performs a reverse operation to that performed by the cyclic AWG 502.

As described above, the present invention suggests an apparatus and method for dividing the wavelength bandwidth to transmit the packet data and the wavelength bandwidth to transmit the label. Accordingly, the wavelength to transmit the packet data and the wavelength to transmit the label can be easily divided by the CWDM.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for transmitting optical packet data and control data about the optical packet data, the method comprising:

grouping a plurality of neighboring wavelengths into at least two wavelength bandwidths, each wavelength bandwidth being composed of neighboring wavelengths; and transmitting the optical packet data and the control data with wavelengths of different wavelength bandwidths respectively using a coarse wavelength division multiplexer (CWDM), and wherein a difference between the wavelength bandwidth to transmit the packet data and the wavelength bandwidth to transmit the control data is λ×n, wherein λ is a difference between the plurality of neighboring wavelengths, and n is a number of wavelengths in one wavelength bandwidth predetermined natural number.

2. The method as claimed in claim 1, wherein, if the plurality of wavelengths are from $\lambda_1$ to $\lambda_{2n}$, a wavelength bandwidth to transmit the packet data is from $\lambda_1$ to $\lambda_n$ and a wavelength bandwidth to transmit the control data is from $\lambda_{n+1}$ to $\lambda_{2n}$.

3. The method as claimed in claim 2, further comprising extracting two pieces of optical data having the difference from the optical data transmitted from an optical path, and dividing the two pieces of optical data.

4. A node which receives optical data including optical packet data and control data about the optical packet data, the node comprising:

a first coarse wavelength division multiplexer configured to divide neighboring wavelengths of a first wavelength bandwidth, which is composed of neighboring wavelengths, and wavelengths of a second wavelength bandwidth;

a packet data receiver configured to receive the optical packet data transmitted with the wavelengths of the first wavelength bandwidth;

a label swapping part configured to receive and update the control data which is transmitted with wavelengths of the second wavelength bandwidth; and a second coarse wavelength division multiplexer configured to combine the packet data received from the packet data receiver and the control data received from the label swapping part into combined optical data and output the combined optical data;

wherein the neighboring wavelengths of the first wavelength bandwidth which transmits the optical packet data and the neighboring wavelengths of the second wavelength bandwidth which transmits the control data are respectively separated by a difference of λ×n, wherein λ is a difference between the plurality of neighboring wavelengths, and n is a number of wavelengths in one wavelength bandwidth predetermined natural number.

5. The node as claimed in claim 4, wherein the first wavelength bandwidth is from $\lambda_1$ to $\lambda_n$ and the second wavelength bandwidth from $\lambda_{n+1}$ to $\lambda_{2n}$.

6. The node as claimed in claim 5, further comprising a first cyclic array wavelength grating configured to extract two pieces of optical data having the difference from the optical data transmitted from an optical path and transmitting the two pieces of optical data to the first coarse wavelength division multiplexer.

7. The node as claimed in claim 6, further comprising a second cyclic array wavelength grating configured to combine the at least two pieces of optical data transmitted from the second coarse wavelength division multiplexer and outputting the combined optical data.

* * * * *